(12) United States Patent
Malik (10) Patent No.: US 7,941,131 B2
(45) Date of Patent: May 10, 2011

(54) EXCHANGE OF MEDIA BY DEVICE DISCOVERY

(75) Inventor: Dale Malik, Atlanta, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 918 days.

(21) Appl. No.: 11/468,288

(22) Filed: Aug. 29, 2006

(65) Prior Publication Data
US 2008/0060043 A1  Mar. 6, 2008

(51) Int. Cl.
*H04B 7/00* (2006.01)
(52) U.S. Cl. ........................... 455/418; 455/41.2
(58) Field of Classification Search .................. 455/41.2, 455/418
See application file for complete search history.

(56) References Cited

U.S. PATENT DOCUMENTS
7,707,231 B2 * 4/2010 LaChapelle et al. .......... 707/804
2005/0286546 A1 * 12/2005 Bassoli et al. ................. 370/432

OTHER PUBLICATIONS

Sonos Digital Music System Controller Setup Guide, pp. 1-14, Aug. 2006.

\* cited by examiner

*Primary Examiner* — Yuwen Pan
(74) *Attorney, Agent, or Firm* — Larson Newman & Abel, LLP (57) ABSTRACT

Media is exchanged by the interaction between devices of an environment. A first device of a first user discovers existing devices within a proximity-based communication range of the first device that have media capable of being shared. As the first user encounters different people and places that have other devices, those other devices are discovered by the first device of the user. A list of available media is provided from the discovered devices to the first device where it is then displayed. The first user may then select a media item from the list to obtain it via sharing or purchase, have it bookmarked for future retrieval from the current source, or request playback of the media item such as by streaming or broadcast. The first device may provide information about capabilities and/or user profile information to the other devices to filter which media items are presented to the first device.

20 Claims, 5 Drawing Sheets

EXCHANGE OF MEDIA BY DEVICE DISCOVERY

TECHNICAL FIELD

Embodiments are related to the exchange of media. More particularly, the embodiments are related to the exchange of media by the discovery of devices and the media available from those devices.

BACKGROUND

Mobile devices are capable of storing media and playing the media for enjoyment by the user. Media can be loaded onto the mobile device through manual processes. The media may come from various sources, such as from an on-line site or from a personal computer. However, the user must be aware of what is available from the on-line site or personal computer by manually performing searches of libraries to find the desired media. Furthermore, the user must take the manual steps of connecting the mobile device to the source of the media and then utilizing a manual file transfer method such as a conventional file system copy feature or a synchronization feature.

Because the user must manually connect to the on-line site or personal computer and then manually explore file systems, the user must have direct access to and at least limited control of the source. While connectivity protocols such as Wi-Fi and Bluetooth® allow for ad hoc and peer-to-peer connectivity, the devices are generally not connected without user intervention and there is no exposure of any information regarding the media that is available from the other devices. Thus, even though the mobile device of the user may come into close proximity to other systems having media items that could be shared with the mobile device, the lack of connectivity and discovery of the media available from the other devices results in the mobile device of the user not benefiting from the media of the surrounding devices.

SUMMARY

Exemplary embodiments address these issues and others by providing continuous discovery by a user device of other devices in proximity that have media that is available for sharing. An alert may be provided to the user of the device and a list of available media may be received and displayed. The user may then be made aware of the media available from the surrounding devices and may opt to receive the media at the device for storage and playback. The transfer of media may be a commercial transaction requiring payment, may alternatively be a free transfer, and so forth. Rather than requesting transfer of the media, the user may bookmark the media by storing a record of where the media item is available.

One embodiment is a method of alerting a user of a first device to the availability of media capable of being shared by an external device. The method involves at least intermittently discovering by the first device whether any external devices containing media capable of being shared with the first device are within proximity-based communication range of the first device. Upon discovering an external device having media capable of being shared, receiving at the first device a list of media that is available from the discovered external device. Upon receiving the list, displaying the list of available media at the first device.

Another embodiment is a computer readable medium containing instructions that perform acts. The acts include at least intermittently discovering by a first device whether any external device containing media capable of being shared with the first device is within proximity-based communication range of the first device. The acts further include upon discovering an external device having media capable of being shared, receiving at the first device a list of media that is available from the discovered external device and displaying the list of available media at the first device.

Another embodiment is a device for alerting a user to the availability of media capable of being shared by an external device. The device includes a communication system, a display system, and a processor. The processor is configured to at least intermittently discover whether any external devices that contain media capable of being shared are in proximity-based communication range of the communication system, receive a list of media from a discovered external device that contains media capable of being shared via the communication system, and display the list of available media via the display system.

DETAILED DESCRIPTION

Exemplary embodiments provide the alerting of the availability of media from the environment of a user of a mobile device and for sharing of that media. Accordingly, as a user of mobile device moves from place to place, media from each encounter is made available to the user. Thus, the user is able to obtain media without having to purposefully seek it out through on-line sources and without having to manually search file systems of other external devices.

Figure 1:
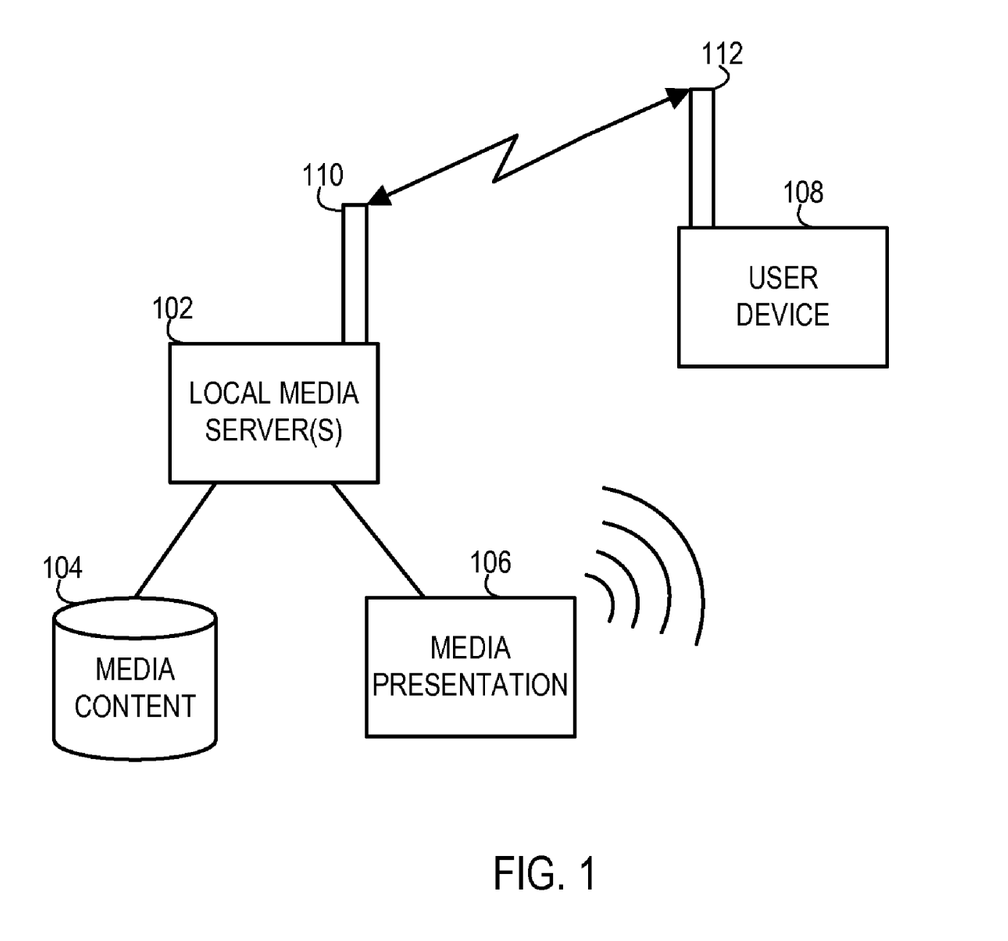
FIG. 1 shows an operating environment for exemplary embodiments.

FIG. 1 shows one example of an operating environment for exemplary embodiments. As shown, an external or source device 102 has access to media content storage 104. The source device 102 may be a dedicated media server, a fixed user device such as a personal computer, or a mobile user device such as a mobile telephone, PDA and the like. The media content storage 104 may be a local storage device, network storage device, or on-line source that the source device 102 has access to. The source device 102 offers a proximity-based communication via an interface 110 such as a physical wired connection or a wireless antenna connection.

The underlying connectivity for the communication interface 110 may utilize Ethernet, Wi-Fi, Bluetooth® communications, and the like. However, a communication protocol is utilized to allow the source device 102 to be discovered by user devices, such as user device 108, that are in close physical proximity to the source device 102. Discussion of the operational flow of the communication protocol for being discovered and interacting with the user device 108 in order to supply media information and items is discussed in more detail below with reference to FIG. 4.

In addition to offering data communication with the user device 108, the source device 102 may also present the media that is made available to the user device 108. The source device 102 may include a media presentation system 106. The media presentation system 106 may include video screens to display video media, may include speakers to provide the audio of audio media, and so forth. The media presentation system 106 may be a complete stand-alone audio and/or audio/video system or may be a built-in audio/video feature of the source device 102.

The source device 102 may thereby have a "now playing" feature whereby a particular media item available from the source device 102 is being played back in the environment for enjoyment by physically proximate users of the user device 108. This playback to those physically proximate users may further capture the attention of the users and entice them to sample, purchase, or otherwise access media content of the source device 102.

In an embodiment of the present invention, the user device 108 is a mobile device that the user may carry when moving from place to place. Examples of mobile devices such as the user device 108 include, but are not limited to, mobile phones, PDAs, dedicated audio or audio/visual playback devices, and the like. The user device 108 has communication interfaces 112 that are compatible with the communication interfaces 110 of the source device 102. The user device 108 is thereby able to discover and exchange information with source devices, such as the source device 102, as the source devices come into communication range of the communication interface 112 of the user device 108. The user device 108 may display information to the user to allow the user to view the media items available from the source device 102 and to provide options to the user for accessing the available media items.

The user device 108 may further have the ability to receive media items from the source device 102. The media items may be received in various forms, such as by snippets, full-length media streams, unrestricted downloads, time-limited downloads, and paid downloads. The user may be given the option as to which format of the media is desired.

Figure 2:
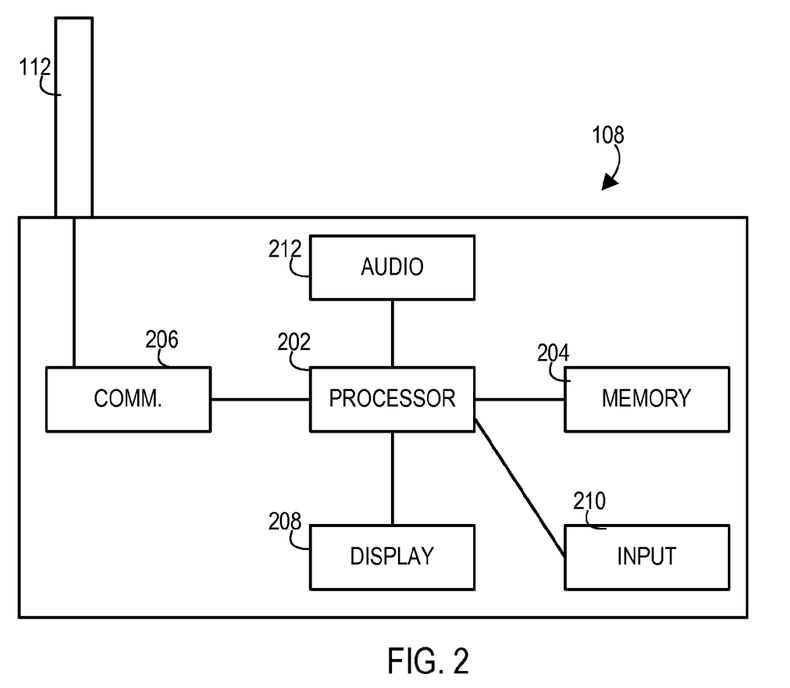
FIG. 2 shows components of an exemplary embodiment of a user device.

FIG. 2 shows an example of the components of an exemplary embodiment of a user device 108. The user device 108 includes a processor 202, such as a general purpose programmable processor or a dedicated purpose processor, hard-wired digital logic, and the like. The processor 202 communicates over an external data bus with memory 204, or memory 204 may be integral to the processor 202. The memory 204 may store media for embodiments where the user device 108 stores media items. The memory 204 may also store operational instructions or programming that the processor 204 may access and implement to perform the logical operations such as those discussed below in relation to FIG. 4. Alternatively, the processor 202 may be hard-wired or otherwise programmed to perform those logical operations.

The processor 202 and the memory 204 are example of computer readable media which store instructions that when performed implement various logical operations. Such computer readable media may include various storage media including electronic, magnetic, and optical storage. Computer readable media may also include communications media, such as wired and wireless connections used to transfer the instructions or send and receive other data messages.

The processor 202 utilizes a communication system 206, such as a wireless transceiver, to communicate via the communication interface 112 with external devices including source device 102. The processor 202 may utilize the communication system 206 to at least intermittently, and in some embodiments continuously, generate query signals that request that source devices respond with an identification of the source device and whether it has available media. The processor 202 may utilize the communication system to at least intermittently, and in some embodiments continuously, listen for responses to the query signals and/or to listen for broadcasts of identification signals generated by source devices 102.

The processor 202 may utilize a display device 208 such as a liquid crystal display screen to display general operational information and to also display information received from the source devices 102 including a media list from the library of the source device 102 and any information regarding a "now playing" media item. The processor may also utilize the display device 208 to display video of any media items that are being received via the communication system 206, such as via streaming, or any media items that have been stored in memory 204.

The processor 202 may utilize an audio device 212 such as a conventional speaker to provide audible cues, such as alerts when a new source device 102 and accompanied media list are encountered. The audio device 212 may also be used to provide the audio playback of media items that are being received via the communication system 206, such as via streaming, or any media items that have been stored in memory 204.

The processor 202 may also utilize an input device 210 to receive user input. The input device 210 may be a touch-screen, keypad, control pad, and the like. The processor 202 may display options for the user on the display 208, and the user may then use the input device 210 to select the desired option.

Figure 3:
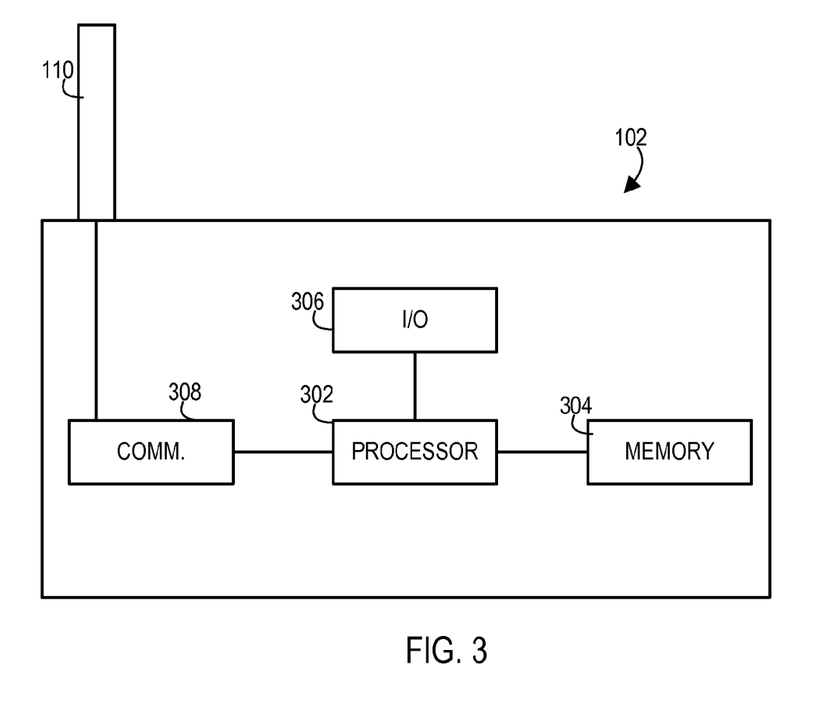
FIG. 3 shows components of an exemplary embodiment of a source device.

FIG. 3 shows an example of the components of an exemplary embodiment of a source device 102. The source device 102 includes a processor 302, such as a general purpose programmable processor or a dedicated purpose processor, hard-wired digital logic, and the like. The processor 302 communicates over an external data bus with memory 304, or memory 304 may be integral to the processor 302. The memory 304 may store media items in addition to or as an alternative to media items being stored on external storage such as local network storage or on-line storage. The memory 304 may also store operational instructions or programming that the processor 304 may access and implement to perform the logical operations such as those discussed below in relation to FIG. 5. Alternatively, the processor 302 may be hard-wired or otherwise programmed to perform those logical operations. The processor 302 and the memory 304 are further examples of computer readable media which store instructions that when performed implement various logical operations.

The processor 302 utilizes a communication system 308, such as a wireless transceiver, to communicate via the communication interface 110 with external devices including user device 108. The processor 302 may utilize the communication system 306 to at least intermittently, and in some embodiments continuously, receive query signals from user devices and respond thereto with an identification of the source device 102 and whether it has available media. The processor 302 may utilize the communication system to at least intermittently, and in some embodiments continuously, broadcast identification signals rather than waiting for specific queries from the user device 108.

The processor 302 may also utilize input/output (I/O) interfaces 306 in order to communicate with various peripheral devices. For example, the I/O 306 may be used to connect to local networks to access network storage of media items and/or to connect to the Internet to access on-line storage of media items. Additionally, the I/O 306 may be used to provide media item information to audio and/or audio/video systems used for the presentation of the media items to nearby users of the user device 108.

Figure 4:
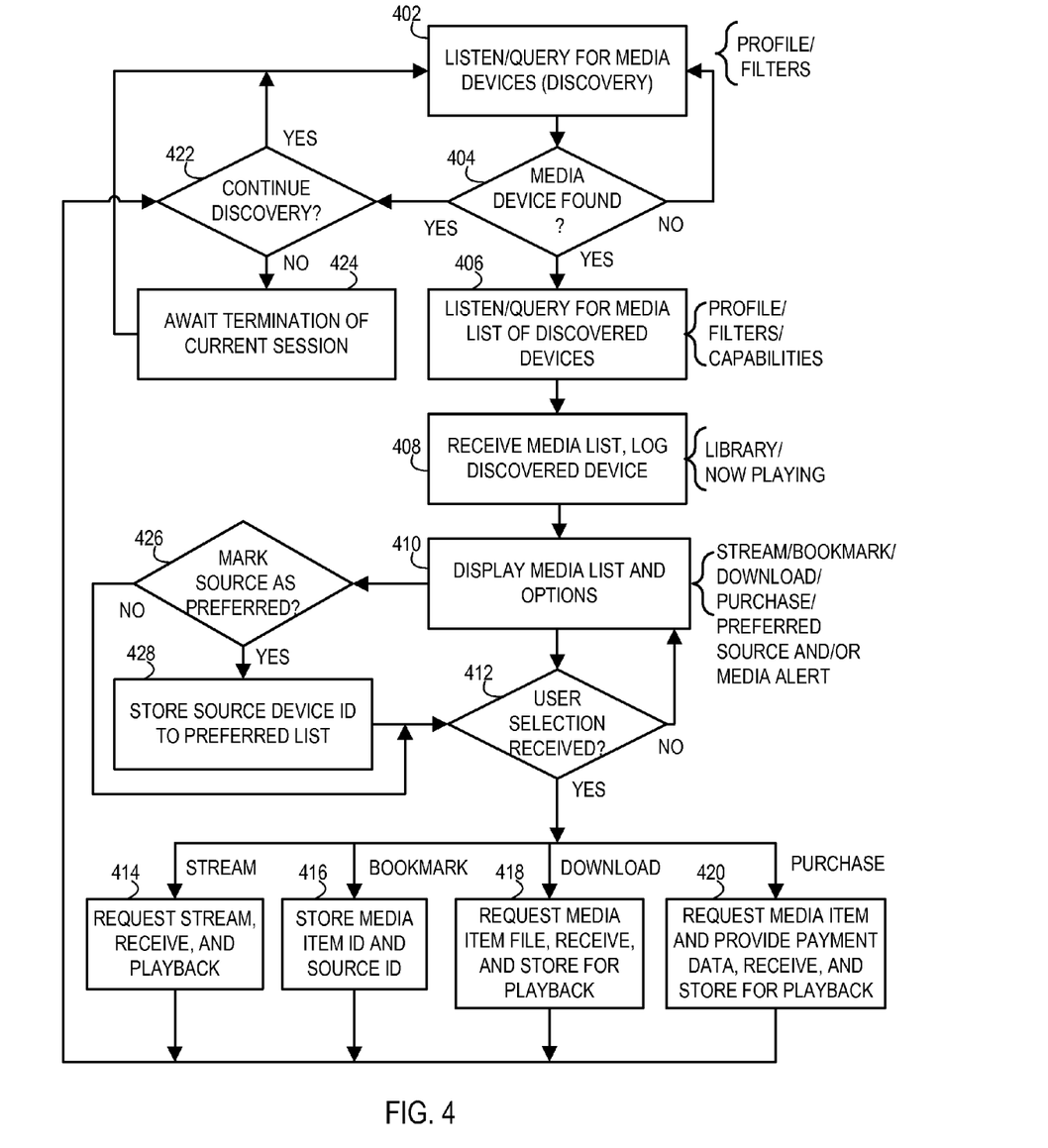
FIG. 4 shows an operational flow of an exemplary embodiment of the user device.

FIG. 4 shows an example of logical operations performed by an exemplary embodiment of a user device 108. The logical operations begin by the user device 108 attempting to at least intermittently, and in some embodiments continuously, discover any source devices, such as the source device 102, that may be within proximity-based communication range at discovery operation 402. The proximity-based communication range may be defined based on the ability of the communication system to receive a signal of a given strength from at least one of the source devices. The proximity-based communication range may also be defined based on other specific factors that can be logically determined such as whether the user device is located within one area when in wireless range of a source device dedicated to a different area. The user device 108 may at least intermittently, and in some embodiments continuously, discover source devices such as by listening for the identifying signal being broadcast by the source devices and/or by broadcasting queries that request a reply by the source devices. As the discovery may range from at least intermittent to continuous discovery, the discovery may be considered an on-going, zero wait state listening/querying operation or may alternatively be repeated or even periodic listening/query attempts.

During the discovery operation 402, the user device 108 may employee profile information and filters for the current user to limit the source devices that will ultimately be discovered. For example, the user device 108 may listen only for specific source devices that have been designated as favorites in the profile by the user of the user device 108. As another example, the user device 108 may specify filters via the profile that limits the discovery to only certain sources such as those that have a particular genre of media, a particular artist, and the like. As discussed below in relation to list operation 406, the profile and filters may be further employed once a source device is discovered in order to limit what options the source device presents to the user device 108. Application of the profile and filters may be applied either at the source device discovery phase or at the media options phase or may be applied at both phases.

Query operation 404 detects whether a source device 102 has been discovered by either one of the methods previously discussed. If not, the user device 108 continues to attempt discovery of source devices 102. Once a source device 102 is discovered, then the user device 108 may alert the user about the presence of a device, such as via audible beeps, flashing displays, or a combination thereof.

Upon discovering the media source device 102, the logical operations of the user device 108 may simultaneously follow parallel paths. For example, after the discovery of the source device 102, query operation may detect whether the user device 108 is to continue attempts at discovering other source devices even while the user device 108 is proceeding with a communication session with the discovered device 102. The user device 108 may be permanently configured to always continue discovery or to never continue discovery. Furthermore, the user device 108 may instead provide a user selectable option to specify that the discovery should or should not continue. The user option may even be specific to the device that has been discovered, where upon discovery of one particular source, the discovery stops but upon discovery of another source, discovery continues.

Where discovery should continue, then the user device 108 continues to listen for and/or query for source devices at discovery operation 402 while the existing communication session proceeds with the logical operations beginning at list operation 406. Where discovery should not continue, then the user device 108 awaits termination of the current session with the current source device at wait operation 424 while the current communication session proceeds with the logical operations beginning at list operation 406.

Returning to the other branch of the parallel operational flow, upon discovering a media source device 102, the user device 108 may also begin to listen or query for a media list of the discovered device at list operation 406. When querying for the media list, the user device 108 may provide additional information to the source device 102, such as profile data including filters and/or device capabilities. For example, the user device 108 may employ a broadcast search mode at list operation 406 whereby the user device 108 sends out a request for media, either specified by characteristics of the media such as the genre and artist or by specifying an identification of a particular media item of interest. In this manner, the source device 102 may only respond if it has a satisfactory match which will be of interest to the user. The user may create preference lists that specify the genre, artists, etc. The preference lists may also specify particular source devices 102 that are acceptable or may specify those that are not acceptable. The preference list may be generated on the fly, such as in response to a notice that a source device has been discovered. Alternatively, the preference list may be stored in memory on the user device 108 to form a component of the user profile. The preference lists may then be transferred to the media source device 102 at list operation 406.

The profile data, filters, and device capabilities may be provided to limit the media items that are included in the media list being returned to the user device 108. For example, the profile data may specify demographical information about the user, such as age, gender, and so forth. The source device 108 may then include media items that are rated as being likely of interest to such a person and/or rated as appropriate for such a person. As another example, the filters may specify to include or not include certain genres of media items or certain media items that involve particular artists or subject matter. Furthermore, the filters may limit media items being returned to those having a particular rating. Additionally, the device capabilities may specify what media types the user device 108 is capable of utilizing such as where the media items themselves can be received and utilized by the user device 108. For example, if the user device 108 is a mobile phone, then ring tones are relevant to the user device 108 and the media list may include a section of ring tones. If the user device 108 is not a mobile phone, then ring tones may be omitted.

Upon requesting the media list, the user device 108 receives the media list at reception operation 408 if the source device 102 does contain media that fits the profile information that the user device 108 has provided. The media list may set forth the library of media items that are available from the source device 102, subject to any limitations on the list imposed by the previously discussed profile data, filters, and capabilities. The media list may also specifically point out which media item is "now playing" where the source device 102 is simultaneously presenting media items via the audio or audio/video systems.

As a result of the media source device 102 providing a response to the query for media items, the user device 108 may log the identification of the media source device 102. In this manner, the user of the user device 108 may later recall those source devices 102 that have been successfully encountered. The user may then choose to revisit those locations in order to establish a communication session with those sources. As discussed below, the user may be given the option to mark the media source device 102 as a preferred one, such as after the media list has been provided to the user for review, and then the discovery operation 402 may employee that preferred list when attempting to discover the available source devices 102.

The user device 108 displays the media list and the available options for the media items of the media list at display operation 410. The options may include a streaming option, a bookmark option, a download option, a purchase option, and the like. At this time, the user device 108 may also provide additional alerts, such as audible beeps to capture the attention of the user where these alerts may be to notify the user that a media list is available, that a media list contains a preferred media item, and/or that a media list of a preferred media source device 102 is being presented.

The presented options may give the user flexibility with respect to a particular media item. The streaming option allows the media item to be streamed to the user device 108 for immediate playback but no storage for later playback, such as to quickly sample the media item to determine whether to bookmark/download/purchase it. The bookmark option allows the user device to store information regarding where this media item has been found, including the source device identification and the media item identification as well as any other relevant information such as time and day of discovery of the media item. Bookmarking the item allows the user of the user device 108 to return to the location in the future should the user later decide to obtain a copy of the media item. The download option allows the user to obtain a copy of the media item that is stored on the user device 108. For example, certain media items may be available on a free or time-limited basis or may be available to those having a passkey that has been previously obtained, such as a passkey that entitles the user to download media items in return for an upfront payment. The purchase option allows the user to perform an electronic purchase of a licensed copy of a media item that is not otherwise available for download.

Upon displaying the media list and options at display operation 410, the operational flow may again take simultaneous parallel paths by proceeding to query operation 412 and to query operation 426. The user device may begin detecting at query operation 426 whether the user has marked the source device 102 specified in the media list as a preferred source. If so, then the user device 108 stores the source device ID to a preferred source list in the user profile data. If not, then this operational flow branch converges with the other at query operation 412.

Query operation 412 detects whether the user has selected one of the options for a particular media item of the media list. Once the user has selected one of the options, then an appropriate course of action is taken. If the user has selected to receive a streaming version of the media item, the user device 108 requests that stream, receives it, and plays it back at streaming operation 414. If the user has selected to bookmark the media item, then the user device 108 stores the media item ID and source ID as well as any additional information regarding the encounter at bookmark operation 416. The user can then later access the bookmark to be reminded of where the media item was available. If the user has selected to download the media item, the user device 108 requests the media item file, receives it and stores it for playback at download operation 418. If the download is a passkey based download, then the request may include the passkey that the source device 102 may check to authorize the download. The user may subsequently access the stored media item file and have it played back when desired. If the user has selected to purchase the media item, then the user device 108 requests the media item, receives and stores the media for playback at purchase operation 420. The request may provide a form of payment such as a credit card account or an account identifier where a payment account has been established in advance.

Figure 5:
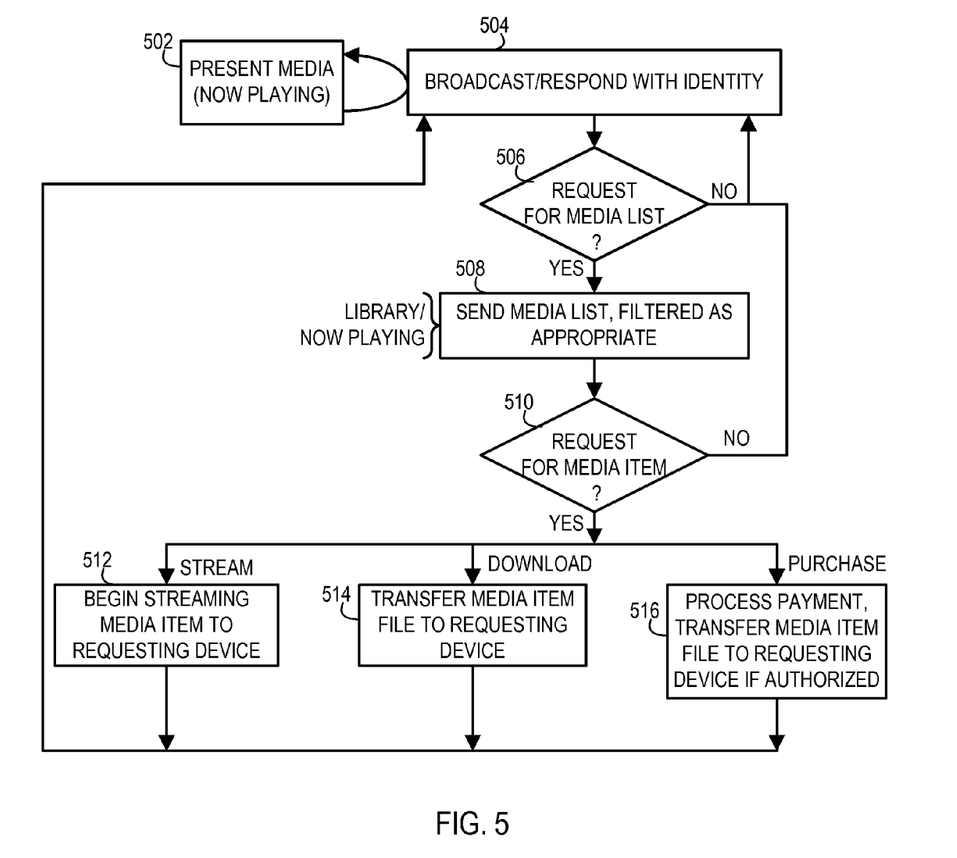
FIG. 5 shows an operational flow of an exemplary embodiment of a source device.

FIG. 5 shows an example of logical operations performed by an exemplary embodiment of a source device 102. The logical operations of this particular example begin at presentation operation 502 and identification operation 504 which operate in parallel. At presentation operation 502, the source device 102 of this example presents media items by playing them through an audio or audio/video system so that users within close physical proximity of the source device 102 are exposed to the media items that the source device 102 makes available. It will be appreciated that presenting the media is merely an option that may be used to capture the attention of the users of the nearby user device 108. At this time, the source device 102 also either broadcasts its identification or listens for and responds to queries at identification operation 504.

Query operation 506 detects whether a request for a media list is received from a user device. Once a request is received, then the source device 102 sends a media list to the requesting user device 108. The media list may be restricted to those media items that are appropriate as dictated by a profile, filters, and/or device capabilities. The media list may include those items of the media library accessible by the source device 102 that are appropriate and may also include an indication of which media item is "now playing."

Query operation 510 detects whether a request for a media item has been received from the user device 108. Once a request from a user device 108 is received, then an appropriate action is taken by the source device 102. If the user device 108 has requested a streaming version of a media item, then the source device 102 begins streaming that media item through its connection to the requesting user device 108 at streaming operation 512. The streaming may be a full length version or may only be a snippet that encourages the user to purchase a licensed copy via a download. If the user device 108 has requested a download, then the source device 102 transfers the media item file to the requesting user device 108 at download operation 514. If the user device 108 has requested to purchase a particular media item, then the source device 102 processes the payment for the item and then transfers the media item file to the requesting user device 108 if the transaction is authorized at purchase operation 516. The processing of the payment may involve receiving a credit card account and performing a credit card authorization check or receiving another form of payment, such as a prepaid account, and performing an authorization check for that account.

Figure 6:
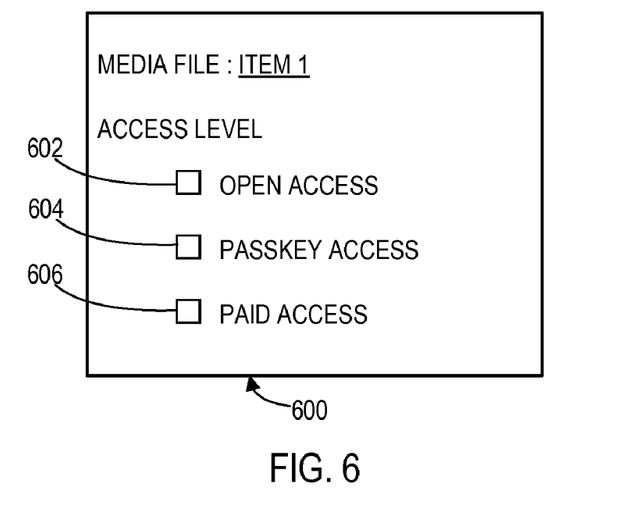
FIG. 6 shows a media access screen display of an exemplary embodiment of the source device.

FIG. 6 shows one example of an administrator screen 600 provided to allow media items to be flagged for appropriate treatment by the source device 102 when selected by the user of a user device 108. For a given media item, this example provides three options to choose from. A first option 602 is for open access, which allows users to select a streaming option to receive a full length or snippet version or a download option to receive an unrestricted or time-limited download. A second option 604 is for passkey access whereby a user may obtain a passkey and then receive a streaming version or download the media file upon authorization of the passkey. A last option 606 is for paid access whereby a user may obtain a streamed version and/or a licensed copy only by purchasing it.

Figure 7:
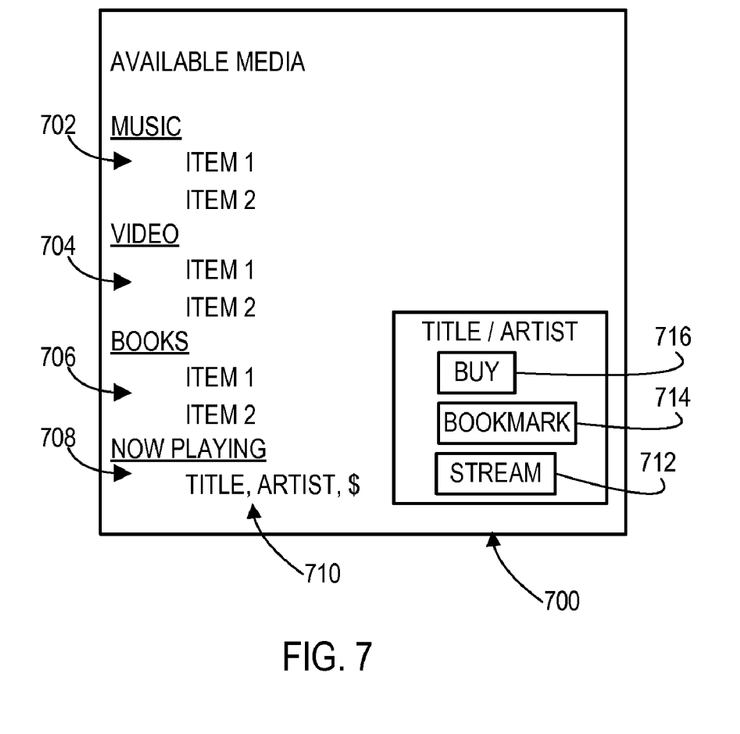
FIG. 7 shows a media list screen display of an exemplary embodiment of the user device.

FIG. 7 shows one example of a screen display 700 of a user device 108 upon encountering a source device 102 having available media items. The screen display 700 includes various sections including a music section 702, a video section 704, and a books section 706 as well as a "now playing" section 708. The "now playing" section as shown provides additional information 710 such as the title of the media, the artist, and the price to purchase. Furthermore, options are provided for selection by the user to access the media items. The user may highlight a particular media item of interest from the media list of the display 700 and then the appropriate options may be displayed for selection. In the example shown, the user has highlighted the "now playing" media item and the resulting options include a streaming option 712, a bookmark option 714, and purchase option 716.

As discussed above, a user of a user device 108 may be alerted to the presence of source devices 102 and their media lists as the user moves about from place to place. For example, the user may enter a particular store where music is playing in the background and a media server is discovered that offers a media list that includes the music being played and offers the option to purchase the media items. While in the store, the user may pass by another individual whose mobile device acts as a source device of unrestricted media. The presence of the mobile device and its media list are provided on the user device 108 of the user. The user may select to stream a snippet of, to bookmark, or to purchase media items from the media server of the store. The user may also select to stream, bookmark, or download a media item from the mobile device of the nearby individual. Accordingly, the user is given the ability to collect media items that are present within the environments that the user is exposed to during daily activities and travels.

While various embodiments have been particularly shown and described, it will be understood by those skilled in the art that various other changes in the form and details may be made therein without departing from the spirit and scope of the invention.

What is claimed is:

1. A method of alerting a user of a first device to an availability of media capable of being shared by an external device, comprising:
   at least intermittently discovering by the first device whether any external devices containing media capable of being shared with the first device are within proximity-based communication range of the first device;
   upon discovering the external device having media capable of being shared, providing a first filter to the external device;
   receiving at the first device a first list from the external device, the first list identifying a first sub-set of the media, the first sub-set determined based on the first filter;
   upon receiving the first list, determining at the first device a second list, the second list identifying a second sub-set of the media the second list determined at the first device based upon the first list and a second filter, and wherein the second list includes media not presently stored at the first device; and
   displaying the second list at the first device.

2. The method of claim 1, wherein discovering by the first device comprises listening for an incoming broadcast from the external device.

3. The method of claim 1, wherein discovering by the first device comprises broadcasting a request for reply from the first device.

4. The method of claim 1, further comprising:
   sending from the first device to the external device a request for media identified on the second list; and
   receiving the requested media at the first device, the requested media provided by the external device.

5. The method of claim 4, wherein receiving the first list of media comprises receiving an offer to purchase the media on the first list, and wherein sending from the first device to the external device a request for media comprises sending payment information to the external device.

6. The method of claim 1, further comprising querying from the first device to the external device for the media that is available from the external device.

7. The method of claim 6, wherein querying from the first device comprises providing information regarding the capabilities of the first device, wherein the first device comprises a mobile phone that has ring tone capabilities and wherein the first list comprises ring tones.

8. The method of claim 6, wherein querying from the first device to the external device for the media that is available from the external device comprises providing profile information of a current user of the first device.

9. The method of claim 8, wherein the profile comprises an indication that the current user listens to a first genre of music and wherein the second list comprises songs from the first genre.

10. The method of claim 1, further comprising storing an identifier of at least one of the media identified on the second list in association with an identifier related to the external device at the first device.

11. A non-transient computer readable medium containing instructions that perform acts comprising:
    at least intermittently discovering by a first device whether any external device containing media capable of being shared with the first device is within proximity-based communication range of the first device;
    upon discovering an external device having media capable of being shared, receiving at the first device a first list of media that is available from the discovered external device;
    upon receiving the first list, determining at the first device a second list of media, the second list of media comprising a sub-set of the first list, wherein the second list is determined based upon a filter at the first device; and
    displaying the second list at the first device, the second list configured to enable downloading of media identified at the second list, the downloaded media to be stored at the first device for playback at a time determined by a user of the first device.

12. The non-transient computer readable medium of claim 11, wherein the acts further comprise:
    receiving a user selection of a media item from the first list of media at the first device;
    sending from the first device to the external device a request for the media item; and
    receiving at the first device the media item being sent from the external device.

13. The non-transient computer readable medium of claim 12, wherein receiving the first list of media comprises receiving an offer to purchase media items from the first list, and wherein sending from the first device to the external device a request for the media item comprises sending payment information to the external device.

14. The non-transient computer readable medium of claim 11, wherein the acts further comprise querying from the first device to the external device for the media that is available from the external device.

15. The non-transient computer readable medium of claim 14, wherein querying from the first device comprises providing information regarding the capabilities of the first device and wherein the first device comprises a mobile phone with ring tone capabilities and wherein the first list comprises ring tones.

16. The non-transient computer readable medium of claim 14, wherein querying from the first device to the external device for the media that is available from the external device comprises providing profile information of a current user of the first device.

17. The non-transient computer readable medium of claim 16, wherein the profile comprises an indication that the current user is a minor and wherein the first list comprises only songs rated for minors.

18. The non-transient computer readable medium of claim 11, wherein the acts further comprise storing an identifier of at least one of the media items of the first list of media in association with an identifier related to the external device at the first device.

19. A device for alerting a user to the availability of media capable of being shared by an external device, comprising:
 a communication system;
 a memory device;
 a display system; and
 a processor configured to continuously discover whether any external devices that contain media capable of being shared are in proximity-based communication range of the communication system, receive a first list of media from a discovered external device that contains media capable of being shared via the communication system, determine at the first device a second list of media, the second list of media comprising a sub-set of the first list, the sub-set determined based upon a filter at the first device, and display the second list via the display system, the second list configured to enable downloading of media identified at the second list, the downloaded media to be stored at the memory device.

20. The device of claim 19, further comprising memory, and wherein the processor is further configured to provide information regarding the capabilities of the first device via the communication system, provide profile information of a current user of the first device via the communication system, and store in the memory an identifier of at least one of the media items of the first list of media in association with an identifier related to the external device.

\* \* \* \* \*